United States Patent [19]

Meek et al.

[11] Patent Number: 4,672,640
[45] Date of Patent: Jun. 9, 1987

[54] RADIO RECEIVER

[75] Inventors: Thomas R. Meek, Harlow; Howard B. Butterfield, Bishops Stortford, both of England

[73] Assignee: Standard Telephones & Cables Public Limited Company, London, England

[21] Appl. No.: 706,396

[22] Filed: Feb. 27, 1985

[30] Foreign Application Priority Data

Mar. 1, 1984 [GB] United Kingdom ............... 8405388

[51] Int. Cl.$^4$ ............................................. H03D 1/22
[52] U.S. Cl. ................................... 375/120; 375/39; 375/81; 375/97; 329/124; 455/265
[58] Field of Search ..................... 375/120, 88, 97, 80, 375/81, 77, 39; 340/825.44; 455/228, 263, 265, 259; 329/124, 50, 104

[56] References Cited

U.S. PATENT DOCUMENTS

| | | | |
|---|---|---|---|
| 3,456,196 | 7/1969 | Schneider | 455/265 |
| 4,193,033 | 3/1980 | Voorman | 375/88 |
| 4,193,034 | 3/1980 | Vance | 375/88 |

FOREIGN PATENT DOCUMENTS

| | | |
|---|---|---|
| 1517121 | 7/1978 | United Kingdom . |
| 1563187 | 3/1980 | United Kingdom . |
| 2099245 | 1/1982 | United Kingdom . |
| 2109201 | 5/1983 | United Kingdom . |

Primary Examiner—Robert L. Griffin
Assistant Examiner—M. Huseman
Attorney, Agent, or Firm—Kerkam, Stowell, Kondracki & Clarke

[57] ABSTRACT

A radio pager for receiving FSK signals has optimally narrow gaussian bandpass filters (F1, F2) and a phase lock loop (11, 12, 13, 14) for preventing local oscillator drift controlled in dependence of the derivation frequency (±4.5 KHz) which is accurately controlled at the transmitter and which is derived from the decoder logic circuit (20).

A significant increase in sensitivity is achieved over existing pagers.

7 Claims, 1 Drawing Figure

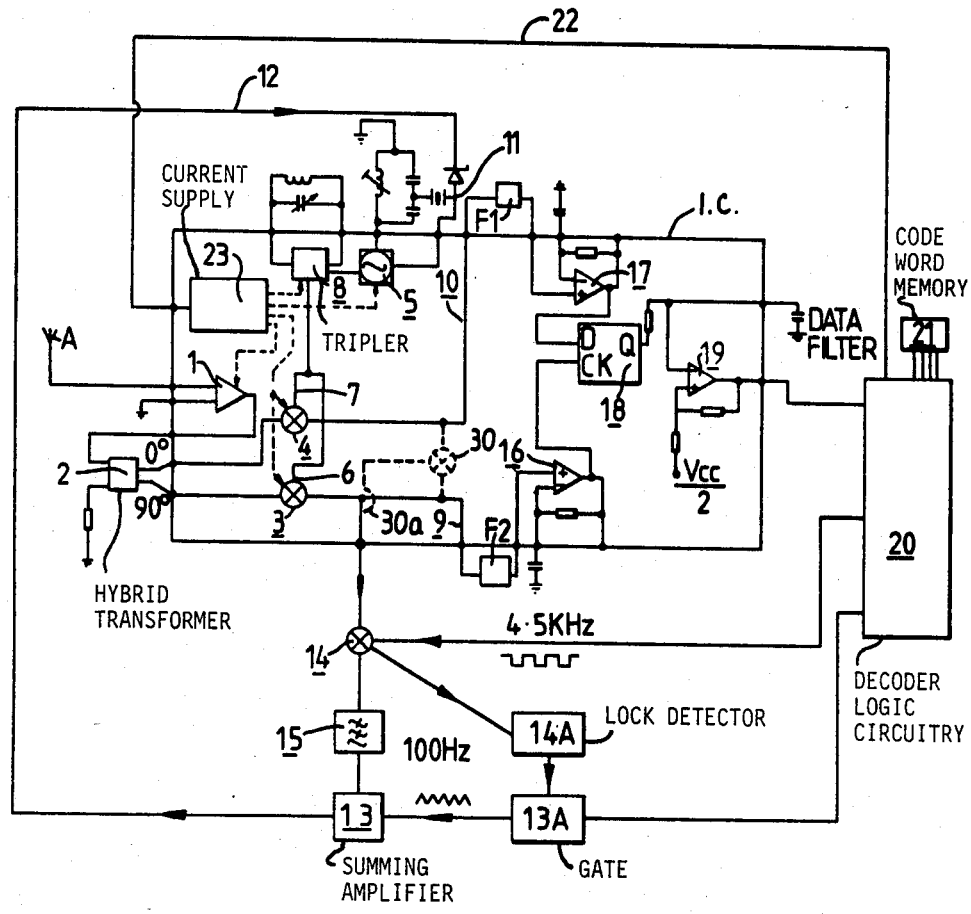

RADIO RECEIVER

BACKGROUND OF THE INVENTION

This invention relates to a radio receiver and particularly although not exclusively to a radio pager using a code format to the POCSAG standard, which is a British Post Office Standard for digital data transmission.

Our British Pat. No. 1517121 describes a radio pager for FSK signals and similar to the STC Model 5C pager. This pager is a tone-only receiver operating in the VHF high band (138-174 MHz). It uses a binary digital code format to the POCSAG standard, which provides the receiver with four addresses, each distinguished by a different alert tone pattern.

In order to make it possible to produce the complete radio receiver on a single chip, a direct conversion technique is employed in which the radio frequency signal is mixed with a local oscillator on the nominal channel frequency, resulting in a "Zero I.F.". Because the radio signal is frequency modulated there is in fact a beat frequency produced in the mixer, equal to the frequency deviation of the carrier. Conventional I.F. strips are replaced by audio frequency amplifiers with this technique, and adjacent channel selectivity is provided by low pass filters.

To make it possible to recover frequency modulation, the radio frequency signal is fed to two paths with a 90 degree phase difference between them. Each path has its own mixer, fed from the same local oscillator and its own low pass filter and limiting amplifier. The phase relationship of the two baseband signals will vary according to whether the radio carrier frequency is above or below the local oscillator frequency. The two baseband signals are combined to recover the modulating signal in a D-type clocked flip-flop to the D-input of which is applied the output of one of the limiting amplifier stages whilst the output of the other limiting amplifier stage is applied to the clock input of the flip-flop.

In the POCSAG radio-paging network, the binary data is modulated onto the r.f. carrier using F.S.K. modulation, as discussed above. The data rate is 512 Bits/sec and a frequency deviation of ±4.5 KHz is used. This high modulation index produces large concentrations of energy separated ±4.5 KHz away from the r.f. carrier. The baseband (low pass) filters that are used in the homodyne (zero I.F.) radio-paging receiver only need to be bandpass filters centered on 4.5 KHz and having a noise equivalent bandwidth of around 1 KHz to produce optimum receiver detection performance. However this argument assumes that the receiver's local oscillator is exactly on frequency or with a very small frequency offset (about 100 Hz). This cannot be achieved with a small, cheap crystal oscillator directly.

A compromise solution adopted on the present Model 5C pager manufactured by Standard Telephones and Cables plc is to use a much larger noise equivalent bandwidth (6.5 KHz) to allow for crystal oscillator temperature drift and crystal aging. The filters then become band pass filters with a 6.5 KHz upper cut-off frequency, the lower cut-off being around 1 KHz, with associated loss of receiver sensitivity.

SUMMARY OF THE INVENTION

According to the present invention there is provided a homodyne radio receiver for receiving digital signals frequency modulated on an R.F. carrier having a predetermined deviation frequency. The receiver includes first and second signal paths to which received radio signals are applied in quadrature, a local oscillator circuit for generating a local oscillating signal, means in each of the signal paths for mixing the local oscillator signal with the respective quadrature signal to produce a baseband signal, an optimally narrow guassian bandpass filter for setting the passband and filtering noise in each of the signal paths connected to the output of the respective mixing means, means for generating a reference signal having a frequency corresponding to the predetermined deviation frequency, and a phase lock loop for controlling the local oscillator frequency. The phase lock loop is responsive to at least one of the baseband signals and to the reference signal, and is operable to control the local oscillator frequency so as to maintain the baseband signal in phase lock with the reference signal.

Thus a phase locked loop is used which locks on to the ±4.5 KHz deviation and this is accurately controlled by the POCSAG transmitter. It is derived in the receiver from the decoder logic circuit, but the data is not extracted from the phase locked loop directly: this just sets the oscillator on frequency.

BRIEF DESCRIPTOIN OF THE DRAWINGS

In order that the invention can be clearly understood reference will now be made to the accompanying drawing which is a circuit diagram of the radio receiver of a radio pager according to an embodiment of the present invention and simplified to explain the main features of the invention.

DESCRIPTION OF THE PREFERRED EMBODIMENT

Referring to the drawing the input from the aerial A is fed to an r.f. amplifier 1. The output from amplifier 1 feeds a hybrid transformer 2 which with associated components (not shown) provides the two signals in quadrature at the mixers 3 and 4.

Mixers 3 and 4 have a local oscillator 5 providing inputs at 6 and 7 via a tripler stage 8. The outputs 9 and 10 from the mixers are fed to respective 4.5 KHz gaussian bandpass filters F1 and F2 each having a 1 KHz band width.

The oscillator 5 is controlled by a crystal 11 which is voltage controlled. It can be tuned over a range of ±3 KHz. An error voltage signal on line 12 is derived summing amplifier 13 which receives a first signal (100 Hz ramp waveform) from the decoder circuit 20 of the radio pager. This overcomes the very narrow locking range of 100 Hz, which now becomes 3 KHz. This first signal is disabled when the phase lock loop circuit is in lock by a lock detector 14A which monitors the analogue mixer 14 to see if it is between the supply rail and the zero rail, at which point lock can be assumed, and this controls a switch 13A which disables the sawtooth waveform so long as the circuit is in lock. A second signal is derived from a 4.5 KHz signal derived from the decoder logic circuitry 20 and mixed by mixer 14 with the signal from one of the mixers (6) to produce a control signal (0 Hz when in lock) which is filtered by a phase lock loop low-pass filter 15. The loop bandwidth is 100 Hz. Mixer 14 acts as a phase shift discriminator. The 4.5 KHz signal from the logic circuitry is inverted when the data output is high. Bit transitions on the output of mixer 3 may cause phase jitter on the phase shift discriminator output but this is reduced to an acceptably low level by the loop filter cut off.

The outputs from the filters F1 and F2 feed the low gain high frequency limiter ampliers 16 and 17 whose signals are combined in the D-type flip-flop 18 to extract the data which is then fed to the decoder logic circuitry, indicated generally by reference numeral 20, via amplifier 19. Conveniently the circuitry within the block marked I.C. is in the form of an integrated circuit, as too would be the logic circuitry 20.

The logic circuitry compares the received codewords with each of four addresses stored in a fusible link diode matrix 21. The circuity includes a master clock oscillator running at 32.768 KHz.

In addition the 4.5 KHz reference waveform to mixer 14 is derived by frequency division and mixing of the 32.768 KHz oscillator. This applies also to the 100 Hz ramp waveform which is applied to summing amplifier 13 and which is preferably derived by dividing the bit rate signal (256 Hz) by 2.5. The signal thus derived by division is then turned into a sawtooth waveform that sweeps the voltage controlled oscillator 5 and sets it in lock. This overcomes narrow locking range problems (set by loop filter cut-off).

In the idle state of the pager, the logic circuit 20 generates a battery saving sampling signal on line 22 which switches on the current supply 23 for powering most of the current consuming circuitry in the receiver (as represented diagramatically by the broken lines) for about one tenth of a second in every second. During this time the received data is examined to see if a valid transmission at 512 bits/sec is present. When valid data is detected the supply 23 is switched on continuously while the decoder circuit 20 looks for a synchronising codeword. Once found the battery saving signal on 22 switches on the power only during synchronising codewords and the two codewords constituting the frame in which the pager's address falls. This mode continues until valid data ceases, when the pager reverts to the idle state. Should a synchronising codeword not be detected while valid data is still present, the battery saving will switch on again continuously until either a synchronising word is found or valid data ceases.

During the frame in which the pager's address occurs, all received codewords are compared with all four possible stored addresses. If a match is found with all except zero, one or two bits different, then the codeword is accepted as a valid call, and is registered in the appropriate one of four memory latches. If the pager is switched to the memory mode, then nothing further happens until the switch is returned to the ON position; but if it is already in the ON state, then the acoustic output of the call is started.

The output signal to the person being paged is either stored or if switched on, bleeps according to the relevant pattern depending on the message.

A modification to the receiver shown in the drawing will now be described. In the drawing the signal is taken off and mixed with 4.5 KHz in mixer 14 to produce a phase-lock control signal. In the case where fast locking time is required a larger loop bandwidth is necessary. The loop bandwidth must be approx. 6 dB/octave roll-off to ensure stable operation, so in the case of large bandwidth, considerable phase jitter may come through the filter due to the 180° phase changes at both transistions in the data stream at point 6.

To eliminate this the modification proposes an extra mixer 30 added between output lines 9 and 10, (i.e. between I and Q channels). This mixer now acts as the P.S.D. (phase-shift-discriminator). Normally the output of this could drive the loop filter but this would result in the local oscillator sitting at 4.5 KHz above or below the proper carrier frequency. Mixer 14 is therefore retained and the output of the added mixer 30 drives mixer 14 via line 30a, the previous connection to the Q channel being broken.

This arrangement reduces phase jitter because the demodulator now acts like a Costas loop and the locking is performed on the "Sunde" signals. All other elements of the circuit remain the same. It should be noted that in the block I.C. representing the integrable component both mixers 14 and 30 could be on or off the chip, as desired.

The use of the phase locked loop and gaussian bandpass filters in accordance with the invention advantageously provides an improvement in receiver sensitivity of some 8dB over presently available pagers.

We claim:

1. A homodyne radio receiver for receiving digital signals frequency modulated on an R.F. carrier having a predetermined deviation frequency, said receiver comprising:

first and second signal paths to which received radio signals are applied in quadrature;

a local oscillator circuit for generating a local oscillator signal;

means in each of said signal paths for mixing the local oscillator signal with the respective quadrature signal to produce a baseband signal;

an optimally narrow guassian bandpass filter for setting the passband and filtering noise in each of said signal paths connected to the output of the respective mixing means;

means for generating a reference signal having a frequency corresponding to the predetermined deviation frequency; and a phase lock loop for controlling the local oscillator frequency, said phase lock loop being responsive to at least one of the baseband signals and to said reference signal and operable to control the local oscillator frequency so as to maintain the baseband signal in phase lock with the reference signal.

2. A receiver as claimed in claim 1, which further comprises:

means connected to the outputs of said optimally narrow gaussian bandpass filters for extracting data corresponding to received digital signals;

decoding circuitry for decoding the extracted data, the decoding circuitry including a master clock oscillator operating at a clock frequency; and the reference signal being derived from the clock frequency.

3. A receiver as claimed in claim 1, which further comprises:

said phase lock loop including a discriminator to which said at least one of the baseband signals and said reference signal are applied, the discriminator output providing a control signal;

means for generating a ramp waveform for increasing the locking range of said phase lock loop; and a summing amplifier for summing the control signal and the ramp waveform to generate an error signal for controlling the local oscillator frequency.

4. A receiver as claimed in a claim 3, wherein the ramp waveform input to the summing amplifier is disabled when the phase lock loop is in lock.

5. A receiver as claimed in claim 2, which further comprises:

said phase lock loop including a discriminator to which said at least one of the baseband signals and said reference signal are applied, the discriminator output providing a control signal;

means for generating a ramp waveform for increasing the locking range of said phase lock loop; and a summing amplifier for summing the control signal and the ramp waveform to generate an error signal for controlling the local oscillator frequency.

6. A receiver as claimed in claim 5, wherein:

said discriminator is a phase-shift discriminator; and wherein said reference signal input to the phase-shift discriminator is inverted when the extracted data has a predetermined logic state.

7. A receiver as claimed in claim 5, wherein the ramp waveform input to the summing amplifier is disabled when the phase lock loop is in lock.

* * * * *